April 14, 1970 W. C. BEARD 3,506,165
VALVE MECHANISM
Filed March 27, 1968 4 Sheets-Sheet 1
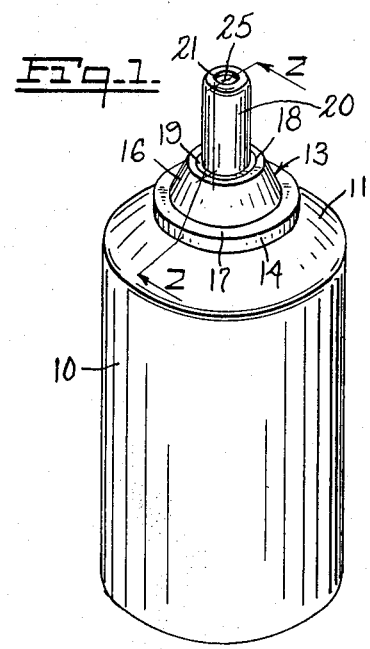
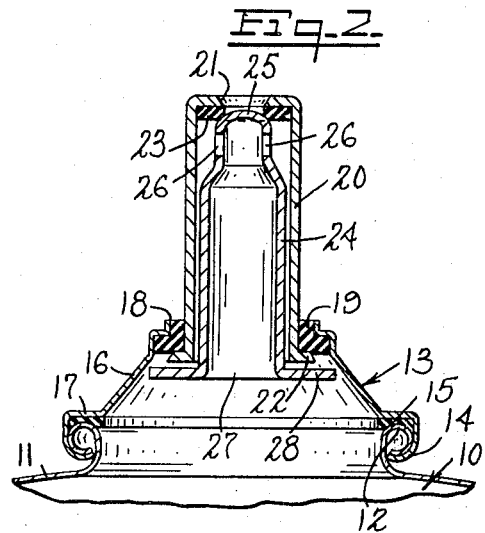
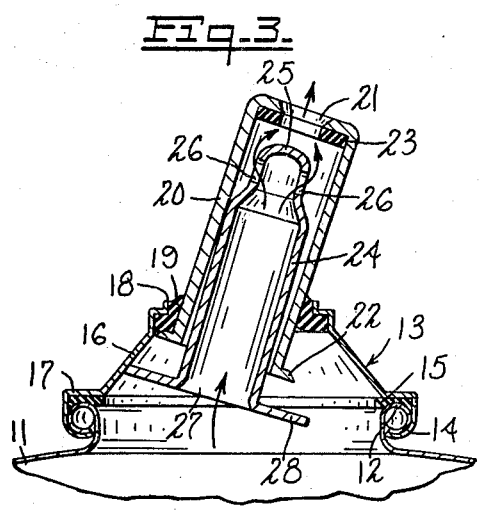
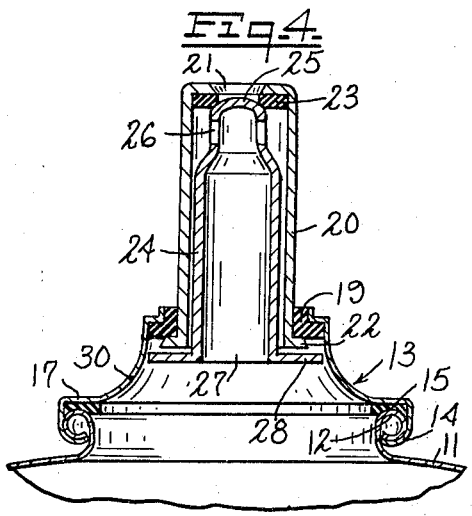
INVENTOR
Walter C. Beard
BY Dedrio and Montgomery
ATTORNEYS

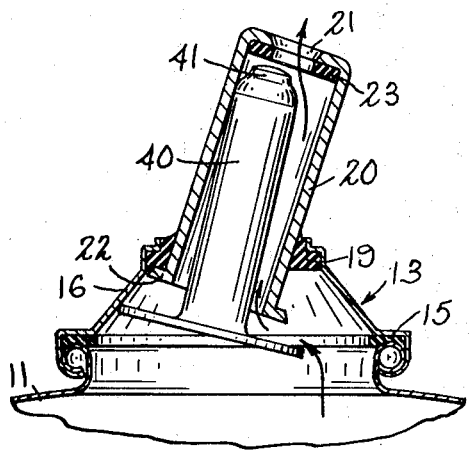
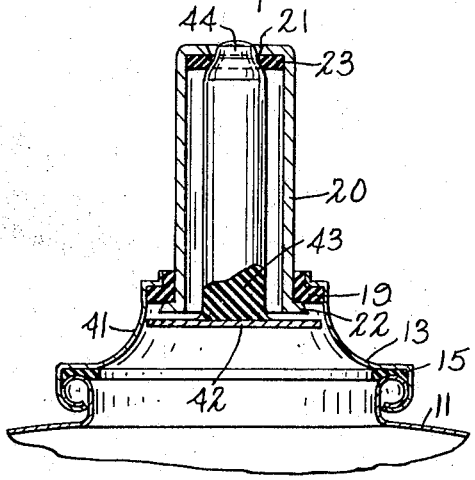
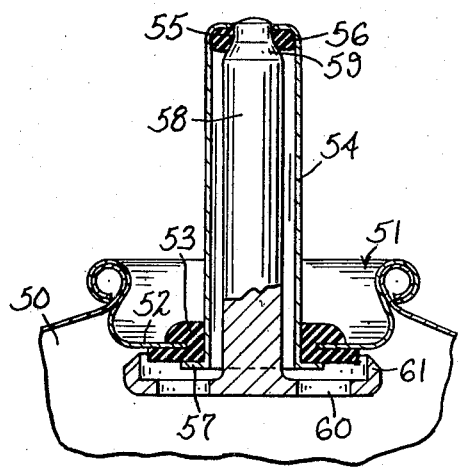
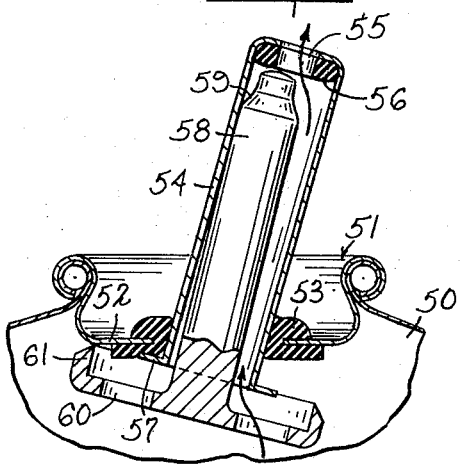

April 14, 1970 — W. C. BEARD — 3,506,165
VALVE MECHANISM
Filed March 27, 1968
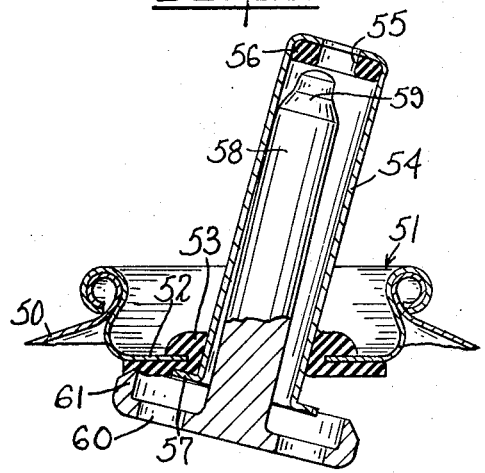
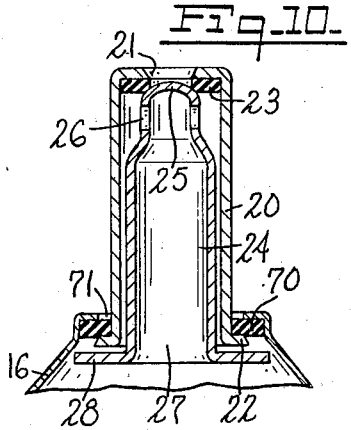
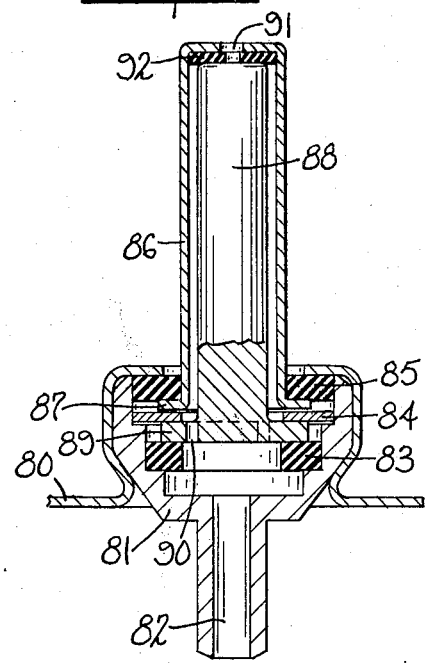
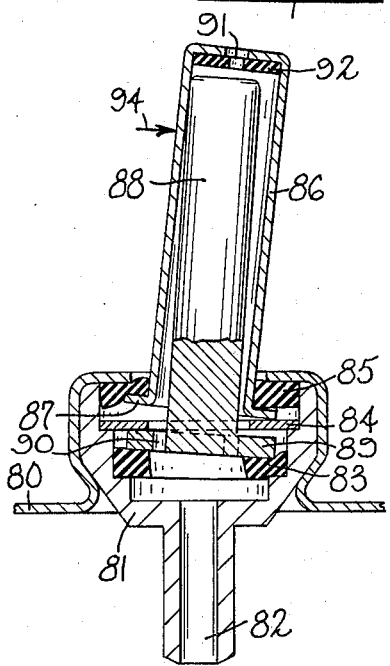
INVENTOR
Walter C. Beard
BY Dedio and Montgomery
ATTORNEYS April 14, 1970 W. C. BEARD 3,506,165
VALVE MECHANISM
Filed March 27, 1968 4 Sheets-Sheet 4
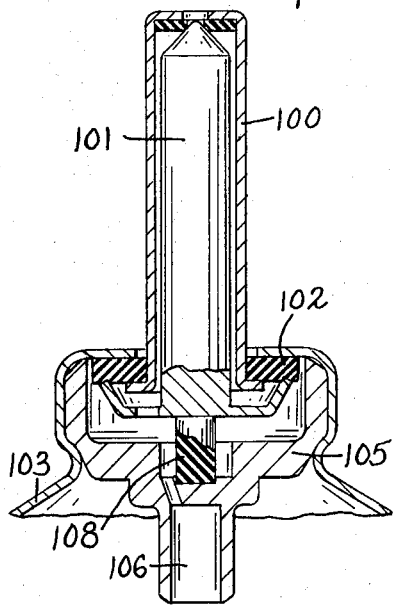
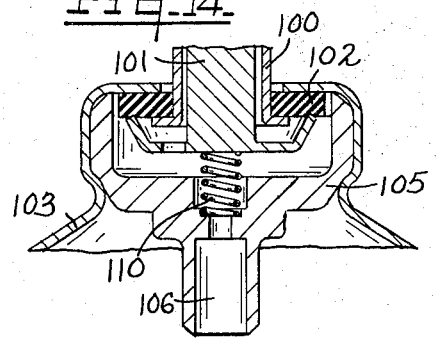
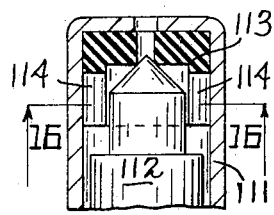
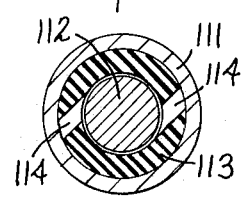
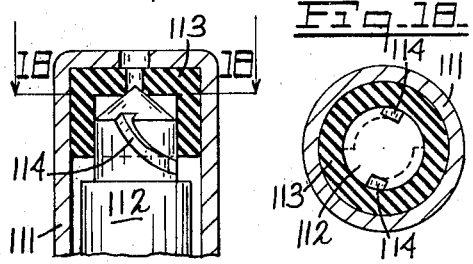
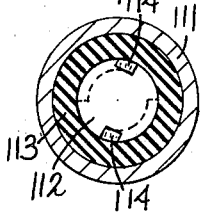
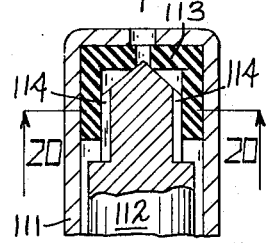
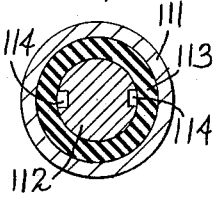
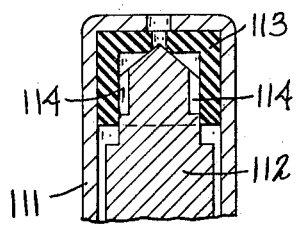
INVENTOR
Walter C. Beard
BY DeLio and Montgomery
ATTORNEYS United States Patent Office 3,506,165
Patented Apr. 14, 1970

3,506,165
VALVE MECHANISM
Walter C. Beard, South St., Middlebury, Conn. 06762
Continuation-in-part of application Ser. No. 629,225,
Apr. 7, 1967. This application Mar. 27, 1968, Ser.
No. 716,415
Int. Cl. B65d 83/14
U.S. Cl. 222—402.22                27 Claims

ABSTRACT OF THE DISCLOSURE

A fluid dispensing valve structure for use with a pressurized container or the like, comprising a resilient member at an opening of the container, a shell positioned and retained by said resilient member, said shell pivotally movable within said resilient member and said shell having an outlet orifice for dispensing fluid, a plug positioned within said shell and movable therein, said plug forming a seal for said orifice internal of said shell and said plug permitting fluid to discharge from said orifice upon pivoting of said shell within said resilient member.

---

This application is a continuation-in-part of U.S. patent application Ser. No. 629,225 filed Apr. 7, 1967.

This invention relates to valve mechanisms generally and more particularly to an improved dispensing valve structure for a pressurized can or the like. The valve of this invention is of the type used on a pressurized container, in which a dispensing nozzle is tilted to effect the opening of the valve structure and allow the discharge of the material in the container.

Valves of this general type heretofore in use have not been particularly suitable for dispensing such material as glue or other sticky or tacky materials which would tend to clog the outlet orifice. Additionally, when such products as whipped cream or toothpaste are to be dispensed, it is highly important that the product not be permitted to accumulate between the valve mechanism and the end of the orifice. In the case of a food product such as whipped cream, there is a tendency of the product to deteriorate, which could cause the forming of harmful bacteria within the spout generally connected to the present-day valve.

With the foregoing in mind, it is a major object of this invention to provide a new and improved dispensing valve structure which may be easily cleaned after use.

Another object of this invention is to provide a new and improved dispensing valve structure with the outlet orifice and valve therefor positioned in the dispensing nozzle at the end thereof and, therefore, easily cleanable.

A further object of this invention is to provide a dispensing valve structure in which the movement of one part thereof with respect to another part thereof is obtained by a new, novel and unobvious manner.

Still other objects and advantages of the invention will in part be obvious and will in part appear from the specification.

The invention accordingly comprises the features of construction, combination of elements and arrangement of parts which will be exemplified in the construction hereinafter set forth and the scope of the invention will be indicated in the claims.

For a fuller understanding of the invention, reference is had to the following description taken in connection with the accompanying drawings, in which—

FIG. 1 is a perspective view of a pressurized container with an embodiment of the dispensing valve structure mounted thereon;

FIG. 2 is a longitudinal medial section through the valve, taken along line 2—2 of FIG. 1;

FIG. 3 is a view similar to FIG. 2, showing the valve in position for dispensing fluid from the container;

FIG. 4 is a view similar to FIG. 2, showing a modified embodiment of the invention;

FIG. 5 is a view similar to FIG. 3, showing another embodiment according to the invention;

FIG. 6 is a sectional view similar to FIG. 2, showing still another embodiment according to the invention;

FIG. 7 is a sectional view showing a further embodiment of the invention;

FIG. 8 is a view of the valve structure of FIG. 7, in an open position;

FIG. 9 is a sectional view similar to FIG. 7, showing yet a further embodiment of this invention;

FIG. 10 is a view similar to FIG. 2, showing still another embodiment of the invention;

FIGS. 11 and 12 are sectional views showing a still further embodiment according to the invention;

FIG. 13 is a sectional view showing means for urging one of the member of the valve against another member of the valve;

FIG. 14 is a view of a portion of FIG. 13, showing an alternate embodiment for accomplishing the result accomplished in FIG. 13;

FIG. 15 is a view of a portion of the valve assembly according to the invention, wherein break-up means are included;

FIG. 16 is a sectional view of FIG. 15;

FIGS. 17 and 18 are views similar to FIGS 15 and 16 showing another embodiment of break-up means;

FIGS. 19 and 20 are views similar to FIGS. 17 and 18 showing yet another embodiment; and FIG. 21 is a view similar to FIG. 19, showing a still further embodiment according to the invention.

Referring to the drawings and particularly FIG. 1, the numeral 10 indicates a container, a can or the like, which is constructed to hold a quantity of material under pressure. Such containers are typical for use in dispensing whipped cream, glue, deodorants, anti-perspirants, or the like, under high pressure. The container 10 is provided with a top portion 11 having a rolled edge 12 as seen in FIG. 2. In accordance with this invention, as shown in FIGS. 1–3, a cap 13 is coupled to the top 11 by means of a rim 14 secured over the edge 12 and tightly sealed therewith by a gasket 15. The cap 13 of this invention is preferably constructed with a side wall 16 which is at an angle with respect to the portions of the cap shown at 17. The angle of the side wall could vary from slightly less than 90° to slightly more than 0° although, for practical purposes, the side wall 16 is at an angle of between 80° to the normal and 10° to the normal. As shown in the diagram, the side wall 16 is at an angle of approximately 45°. The cap 13 is provided with an opening shown at 18 in which is mounted a flexible and resilient seal 19. Positioned within the seal 19 and supported thereon is an outer shell 20 having an orifice 21 formed therein and preferably having a flange 22 for retaining it within the resilient seal 19. The seal 19 could be of rubber or of other commonly utilized plastic material exhibiting a resiliency resembling that of rubber. The outer shell could be of a rigid metal material, plastic styrene material, or polypropylene material, or the like. In the preferred embodiment, the cap 13 is also of a rigid material, such as metal or plastic.

Positioned just under and about the orifice 21 is a sealing member shown at 23 which could be of a rubber or plastic material or the like, commonly used as seals. Within the hollow shell 20 is provided a plug member 24 having a top portion 25 and one opening or a plurality of openings, shown at 26, formed therein. The plug member of the preferred embodiment is shown as being hollow with a central inlet 27 for permitting fluid from the container 10 to enter therein. The member 24 also includes a flange portion 28 for engaging the side wall 16.

In the preferred embodiments of the invention, the seal is made internally, at a point at the end of the shell 20 which acts as a nozzle. Because of the construction of the preferred embodiments, with the internal type of nozzle seal, it is quite evident that the valve mechanism is easily cleanable by the user.

Referring now particularly to FIG. 3, there is shown the valve structure of the invention in an open position. To open the valve structure, the shell 20 is pushed to one side or tilted, which causes it to pivot within the resilient member 19. When this occurs, the inner rigid member 24 begins to pull away and slide down the side wall 16 due to the action of its flange 28 sliding downwardly along the side wall 16. Because of the configuration of the cap and the cooperating inner rigid plug member 24, a substantial mechanical advantage is obtained. Thus, the valve opens widely and fluid is dispensed through the interior hollow plug 24, thence through openings 26 and the orifice 21.

With reference now to FIG. 4, an alternate embodiment of the configuration of FIGS. 1–3 is shown. In this construction, the cap 13 is provided with a curved wall 30 instead of a linear or planar surface wall. The curvilinear portion 30 may have the configuration of an arc of a circle or may be the arc of an ellipse or other suitable geometric figure. The surface of the portion 30 may be either entirely curved or may be a combination of a curve and a linear surface, in order to provide a mechanical advantage as the shell 20 is tilted and the flange 28 engages wall 30.

Referring to FIG. 5, a further alternate embodiment is shown. In this figure the cap 13 is of the type shown in FIG. 1, and, additionally, the shell 20 is of the same configuration. Instead of a hollow rigid plug, as shown in FIGS. 1–4, there is provided a solid plug member 40 having a tip 41 for engaging the seal 23. The diameter of the plug is substantially narrower than the plug of FIGS. 1–4. Accordingly, as the shell 20 is tilted, the plug 40 will move downwardly and the material within the container 10 will move outwardly, as shown by the arrows.

With reference to FIG. 6, there is shown yet another embodiment of the invention. In this embodiment, the cap is shown constructed as in FIG. 4 and has a curved surface portion 41. Additionally in this embodiment, the plug is constructed as in FIG. 5 but, instead of the plug being entirely a rigid member, it is constructed with a bottom portion 42 of a rigid material and a central portion 43 of a flexible material, such as a rubber or flexible plastic. In this case, the seal would be made directly between the resilient plug portion 43 and the outer shell 20 shown in the previous figures. It would not be necessary for the rubber seal 23, incorporated in the other embodiments, to be incorporated in this embodiment, although it should be understood that the seal 23 may be so incorporated, if desired.

It should also be understood that the portion 43 could comprise a solid member over most of it and only be provided with a resilient top portion, shown at 44. In this manner, a seal could be obtained between the shell 20 and the plug. It should be further understood that the topmost portion of the plug members may just meet the shell portion about the orifice or the shell seal or, if desired, the topmost portion of the plug may extend above or into the orfice, thus making it substantially easier to clean the structure.

Now referring to FIG. 7, still another embodiment of the invention is shown. The container of this figure is shown at 50 and is provided with an inward descending cap 51 preferably having a flat portion 52, although it is to be understood that this portion may be slightly inclined, if desired. A sealing means 53 supports an outer hollow shell 54. Within the shell 54 is provided an orifice 55 and about said orifice, within the shell housing is a resilient seal element shown at 56. Flanges 57 are provided at the base of the shell to retain it within the container. Positioned within the shell 54 is a preferably rigid member 58 which includes a shoulder portion 59 for forming a seal with the sealing element 56. As shown in this figure, the tip of the plug 58 extends above the orifice 55. The plug 58 has a diameter narrower than the diameter of the interior of the shell 54. The plug 58 also includes one opening or a plurality of openings 60 for permitting fluid from the container to travel to the orifice 55. The portion of the plug member 58 having the opening 60 is provided with an upwardly extending flange 61. In the configuration of FIG. 7, this flange is L-shaped although it should be understood that the shape of the flange could be modified so long as its construction is such that it may make contact with the cap portion 52 for pivoting thereabout.

Now referring to FIG. 8, there is shown the dispensing structure of FIG. 7 in operation. As shown by the arrows, the fluid will pass from the interior of the container 50 and thence outward of the orifice 55.

Referring now to FIG. 9, which is similar to FIG. 7, and in which like numbers are used for like parts, the main difference in the structure in this figure is that the sealing or resilient member 53 is extended under the flat cap portion 52 such that the upwardly extending flange 61 engages the member 53 rather than the flat portion 52. It will thus be seen that many variations could be made in the structure of FIGS. 7 and 8.

With reference now to FIG. 10, there is shown the structure of FIG. 2, but with a modification of the resilient shell holding member of FIG. 2. Since the parts are quite similar in FIGS. 2 and 10, like numbers are utilized for like parts. The major difference in FIG. 10, is that instead of the fitted resilient seal 19, there is provided a resilient washer or disc member 70 which extends into the opening of the container shown at 71. The container is formed such that the member 70 will be held in place so as to laterally position the shell 20.

Referring to FIGS. 11 and 12, another embodiment is shown, according to the invention. In this particular embodiment, the container is generally shown at 80 and is formed such that it supports a supporting member 81 which has an opening 82 for permitting the passage of fluid therethrough. The member 81 supports a resilient member 83, a non-resilient member 84 which could be of metal, plastic or hard rubber. Above the member 84 is positioned a resilient washer or disc 85 of the same type shown at 70 in FIG. 10. Positioned within the container and forming the valve mechanism is a shell 86 having a flanged portion 87 seated between the members 85 and 84. Within the shell member there is provided a plug 88 having a flanged portion 89 positioned between the non-resilient member 84 and the resilient member 83. Fluid is permitted to pass through an orifice shown at 90 in the plug 88 and thence through outlet orifice 91 in the shell. A topmost sealing member 92 engages the plug 88. It is to be understood that the plug 88 could be equipped with a sealing surface which would insure a positive closure of the orifice 91.

FIG. 12 shows the position of the shell in the plug when they are in use. If it is assumed that the shell is pushed in the direction of the arrow 94, the plug will pivot in one direction against the non-resilient member 84 and the shell will pivot in the opposite direction against the member 84. The fluid will thus pass from the interior of the container, about the plug member and outwardly through the orifice 91.

Reference should now be had to FIGS. 13 and 14 which generally illustrate means for insuring that the plug in the various FIGURES 1–2 will securely close. These means disclosed in FIGS. 13 and 14 are not necessary in all cases, particularly where the fluid is of a heavy, viscous nature, but they will find application in cases where fine sprays such as anti-perspirants are to be dispensed. In FIG. 13 the shell and plug members are shown at 100 and 101, respectively. These members are retained within a resilient disc 102 within the top portion of the container 103. By tilting the shell, the plug 101 will pivot so as to provide an opening through the shell 100 since one member will pivot more than the other. To insure a consistent closure, a supporting element 105 is provided, which is positioned within the container 103. The element 105 comprises an elongated channel 106 for the entry and passage therethrough of fluid. To insure closure, there is provided a resilient member such as a slug of rubber or the like at 108, which is seated between the supporting element 105 and the plug 101.

FIG. 14 shows a similar structure to FIG. 13 but, in the place of the resilient member 108, a spring 110 is provided.

Reference is now made to FIGS. 15-21, which disclose means for effecting mechanical break-up, expansive break-up or imparting a swirl to the fluid being discharged from a pressurized container, which is termed break-up for the purposes of this invention. The structures illustrated in these figures are usable in any of the configurations shown in the other figures of this application. FIGS. 15 and 16 show a shell 111 and a plug member 112. The sealing member is shown at 113, in which are formed channels 114 for breaking up the fluid being dispensed. The channels 114 could be placed at an angle or vertically so as to produce a swirl effect. FIG. 17 shows the shell 111, the plug 112 and the resilient sealing member 113. In this case, the plug 112 is formed with a spiraling channel 114.

FIGS. 19 and 20 again show the shell at 111, the plug at 112 and resilient sealing member at 113. In this embodiment, the plug is formed with channels 114 along the sides thereof for causing expansive break-up of the fluid being discharged. FIG. 21 is a modified embodiment of FIGS. 19 and 20 in that the channels 114 are of a shorter length.

It will thus be seen that the objects set forth above, among those made apparent from the preceding description, are efficiently attained and since certain changes may be made in the above constructions without departing from the spirit and scope of the invention, it is intended that all matter contained in the foregoing description and shown in the accompanying drawings shall be interpreted as illustrative and not in a limiting sense.

What is claimed is:

1. A fluid dispensing valve structure for use with a pressurized container or the like having an opening, comprising a resilient member positioned at the opening of the container, a non-resilient shell positioned and retained by said resilient member, said shell pivotally movable within said resilient member and said shell having an outlet orifice for dispensing fluid at the upper end of the shell, a plug positioned within said shell and movable therein, said plug forming a seal for said orifice at the upper end of the shell internal of said shell, and said plug permitting fluid to discharge from said orifice upon pivoting of said shell within said resilient member, said plug supported to pivot and retractably move away from said shell orifice upon pivoting of said shell.

2. A fluid dispensing valve structure according to claim 1, in which a cap is provided on the container opening and in which the resilient member is mounted in an opening in said cap, said cap having a wall and said plug having abutment means for abutting said wall such that as the shell is pivoted the abutment means bears against the wall as it draws away from the orifice.

3. A fluid dispensing valve structure according to claim 2, in which the side wall of the cap is at an angle with respect to the base of the container.

4. A fluid dispensing valve structure according to claim 3, in which the side wall is a conical surface.

5. A fluid dispensing valve structure according to claim 3, in which the side wall is a curvilinear surface.

6. A fluid dispensing valve structure according to claim 2, in which the side wall is in a plane substantially parallel to the plane of the base of the container, and in which the abutment means comprises a flange having a bent portion extending upwardly to abut said side wall.

7. A fluid dispensing structure according to claim 2, in which the plug is hollow and has an inlet opening at the lower end of said plug and an outlet opening adjacent the area on said plug which is used to seal the orifice in said shell such that fluid can pass through the plug before passing out of the orifice.

8. A fluid dispensing structure according to claim 2, in which resilient seal means is positioned within said shell and about said orifice.

9. A fluid dispensing structure according to claim 2, in which said plug has a resilient portion for sealing said orifice.

10. A fluid dispensing structure according to claim 2, in which the plug is solid and has a portion thereof narrower in width than the interior width of said shell, such that fluid passes between said plug and said shell as it flows toward said orifice.

11. A fluid dispensing structure according to claim 10, in which the plug has a flange portion for abutting the side wall of said cap and in which an opening is formed in said flange.

12. A fluid dispensing valve structure according to claim 1, in which the resilient member is fitted within the opening and in which the shell is slidable within the resilient member.

13. A fluid dispensing valve structure according to claim 1, in which the resilient member is positioned about the opening so as to reduce the area of the opening.

14. A fluid dispensing valve structure according to claim 1, in which at least a portion of the resilient member extends into said container and in which the plug engages the resilient member when fluid is being discharged from the container.

15. A fluid dispensing valve structure according to claim 1, in which the container has an inner wall and in which a flange on the plug engages the inner wall when fluid is being discharged from the container.

16. A fluid dispensing valve structure according to claim 1, in which means are provided in said valve for positively positioning said plug to seal the outlet orifice in said shell.

17. A fluid dispensing valve structure according to claim 16, in which said last-mentioned means comprises resilient biasing means.

18. A fluid dispensing valve structure according to claim 16, in which said last-mentioned means comprises a support element positioned within said container, said support element having fluid passage means formed therein and wherein a resilient elastomeric member is supported by said support element against said plug.

19. A fluid dispensing valve structure according to claim 16, in which said last-mentioned means comprises a support element positioned within said container, said support element having fluid passage means formed therein, and wherein a spring is supported by said support element against said plug.

20. A fluid dispensing valve structure according to claim 1, in which channel means are formed in the part of said plug which seals said orifice so as to impart swirling motion to the fluid passing out of the orifice.

21. A fluid dispensing valve structure according to claim 1, in which there is provided a resilient sealing member positioned at the internal side of the outlet orifice of said shell.

22. A fluid dispensing valve structure according to claim 21, in which channel means are formed in said sealing member to break up the fluid being dispensed.

23. A fluid dispensing valve structure for use with a pressurized container or the like having an opening, comprising a first resilient member positioned at the opening of the container, a non-resilient shell positioned and retained by said first resilient member, said shell pivotally movable while retained by said first resilient member, said shell having an outlet orifice at the upper end thereof for dispensing fluid, support means positioned in said container, a substantially nonresilient member supported by said support means such that it supports the shell, a plug positioned within said shell and movable therein, said plug forming a seal for said orifice internally of said shell, a second resilient member supported by said support means, said plug having a portion positioned between said second resilient member and said substantially non-resilient member, wherein said plug is retractably movable within said shell.

24. A fluid dispensing valve structure according to claim 23, in which the plug is provided with break-up means at the part of the plug which seals said orifice.

25. A fluid dispensing valve structure according to claim 23, in which a resilient sealing member is provided and positioned at the internal side of the outlet orifice of said shell.

26. A fluid dispensing valve structure according to claim 25, in which the sealing member is provided with break-up means.

27. A fluid dispensing valve structure for dispensing pressurized fluids for use with a pressurized container having an opening, comprising
(a) a resilient member positioned in said opening,
(b) a non-resilient shell having an orifice at one end thereof and a flange at the other end, wherein said shell is supported by said resilient member about said flange such that said shell can move within said resilient member, and wherein said orifice is located on that end of the shell that projects externally from said container,
(c) a plug having a flange at one end and located in said shell such that the other end of said plug abuts and seals the orifice in said shell, and
(d) abutment means in said container such that when the shell is moved sideways the flange on said plug abuts said means so that the plug retractably moves within said shell to open said orifice to allow pressurized fluid to pass out of said shell.

References Cited
UNITED STATES PATENTS

| | | | |
|---|---|---|---|
| 2,120,611 | 6/1938 | Huss | 239—589 X |
| 2,772,035 | 11/1956 | Collins et al. | 222—402.23 |
| 2,831,620 | 4/1958 | Schlicksupp | 222—517 |
| 2,954,903 | 10/1960 | Collins | 222—402.23 |
| 2,965,312 | 12/1960 | Hale | 239—577 X |
| 3,060,965 | 10/1962 | Taggart | 222—402.22 X |
| 3,357,604 | 12/1967 | Barker | 222—402.23 |

SAMUEL F. COLEMAN, Primary Examiner

N. L. STACK, JR., Assistant Examiner

U.S. Cl. X.R.

222—517, 402.23